(12) United States Patent
Lohre et al.

(10) Patent No.: US 8,966,150 B2
(45) Date of Patent: Feb. 24, 2015

(54) AUTOMATED SYSTEM AND CONTROL DEVICE FOR IDENTIFYING A CONNECTING ELEMENT

(75) Inventors: Hubertus Lohre, Steinheim (DE); Norbert Joestingmeier, Lemgo (DE)

(73) Assignee: Phoenix Contact GmbH & Co. KG (DE)

( * ) Notice: Subject to any disclaimer, the term of this patent is extended or adjusted under 35 U.S.C. 154(b) by 793 days.

(21) Appl. No.: 12/743,039

(22) PCT Filed: Nov. 18, 2008

(86) PCT No.: PCT/EP2008/009744
§ 371 (c)(1),
(2), (4) Date: Sep. 1, 2010

(87) PCT Pub. No.: WO2009/065554
PCT Pub. Date: May 28, 2009

(65) Prior Publication Data
US 2010/0318702 A1    Dec. 16, 2010

(30) Foreign Application Priority Data
Nov. 20, 2007   (DE) .......................... 10 2007 055 613

(51) Int. Cl.
*G06F 11/00*   (2006.01)
*G05B 19/05*   (2006.01)

(52) U.S. Cl.
CPC ...... *G05B 19/054* (2013.01); *G05B 2219/1104* (2013.01); *G05B 2219/1178* (2013.01); *G05B 2219/14089* (2013.01)
USPC .......................................... 710/305; 714/799

(58) Field of Classification Search
USPC .................. 710/107, 300, 305; 714/799
See application file for complete search history.

(56) References Cited

U.S. PATENT DOCUMENTS

| 4,616,306 A | 10/1986 | Kuzma et al. |
| 6,535,138 B1 * | 3/2003 | Dolan et al. ............. 340/815.47 |
| 6,549,034 B1 * | 4/2003 | Pietrzyk et al. .................. 326/38 |

(Continued)

FOREIGN PATENT DOCUMENTS

| EP | 0838739 A1 | 4/1998 |
| EP | 1832944 A1 | 9/2007 |

OTHER PUBLICATIONS

"International Preliminary Examination Report for International Application No. PCT/EP2008/009744", Mar. 23, 2010, Publisher: European Patent Office.

(Continued)

*Primary Examiner* — Nimesh G Patel
(74) *Attorney, Agent, or Firm* — Kaplan Breyer Schwarz & Ottesen, LLP

(57) ABSTRACT

The invention relates to an automated system in which a targeted search may be made for connecting terminals without having to actuate a load connected thereto. For this purpose, the automated system has a communication network, a programmable control unit, and at least one modular bus subscriber which are connected to the communication network. The modular bus subscriber has multiple groups of connecting elements, a display element being associated with each group of connecting elements. An evaluation and control unit is also provided which actuates at least one selected display element in response to signaling information originating from the programmable control unit. The programmable control unit is designed to provide this type of signaling information.

6 Claims, 2 Drawing Sheets

(56) References Cited

U.S. PATENT DOCUMENTS

| | | | |
|---|---|---|---|
| 6,823,480 B1* | 11/2004 | Brown | 714/44 |
| 2004/0008034 A1* | 1/2004 | Mastoris et al. | 324/538 |
| 2004/0017184 A1* | 1/2004 | Shen et al. | 324/158.1 |
| 2005/0071715 A1* | 3/2005 | Kolman | 714/724 |
| 2006/0224826 A1* | 10/2006 | Arai et al. | 711/114 |
| 2007/0208435 A1* | 9/2007 | Schott | 700/17 |

OTHER PUBLICATIONS

"International Search Report and Written Opinion for International Application No. PCT/EP2008/009744", May 8, 2009, Publisher: International Bureau.

* cited by examiner

AUTOMATED SYSTEM AND CONTROL DEVICE FOR IDENTIFYING A CONNECTING ELEMENT

FIELD OF INVENTION

The present invention relates in general to the field of industrial automation technology, and in particular to an automated system for identifying at least one group of connecting elements within a modular bus subscriber connected to a communication network. The invention further relates to a control device for identifying at least one group of connecting elements.

BACKGROUND OF THE INVENTION

Field bus systems such as the interbus or the process field bus, for example, have been used for quite some time in industrial automation technology. A programmable control unit and multiple bus subscribers, for example, may be connected to one another via a field bus. Process data are cyclically or acyclically exchanged between the control unit and the bus subscribers as a function of the importance. Process data may represent I/O data, diagnostic data, and the like. A bus subscriber may be an interface module to which multiple sensors and actuators may be connected.

Such field bus systems are becoming increasingly more complex and powerful, as evidenced, among other things, by the increasingly smaller housing dimensions of the bus subscribers, with a simultaneous increase in the connection options for sensors and actuators.

SUMMARY OF THE INVENTION

The object of the present invention is to provide an automated system which allows an operator, during startup and/or maintenance of an automated system, to easily and quickly carry out a wiring check and to more quickly identify components which are malfunctioning or in need of replacement, in particular without knowledge of the entire process map.

At this point it is noted that in a wiring check, a check is made as to whether the signals transmitted from a control unit to a given component actually arrive at that location.

This technical problem is solved using an automated system comprising a communication network, a programmable control unit, and at least one modular bus subscriber which are connected to the communication network. It is noted that the communication network may be any bus system, for example a field bus according to the interbus or the process field bus design. The at least one modular bus subscriber has multiple groups of connecting elements, which may also be terminal contacts. A display element is associated with each group of connecting elements. A light-emitting diode may be used as the display element. Depending on the implementation of the bus subscriber, a sensor or actuator may be connected to each group of connecting elements. In addition, the at least one modular bus subscriber has an evaluation and control unit which actuates at least one selected display element in response to signaling information originating from the programmable control unit. For this purpose the programmable control unit is designed to provide appropriate signaling information.

It is noted that the signaling information may contain a control signal for actuating at least one selected display element. It is further noted that the feature "group of connecting elements" is also intended to include the case that only a single connecting element is present.

To allow a display element to be actuated in a targeted manner, the signaling information contains an indication of the address of at least one group of connecting elements and/or the site of connection of the particular group of connecting elements within the communication network. The address of the group of connecting elements may be a sequential number. In particular for the interbus, addressing of the bus subscribers may be dispensed with, since the physical installation sites of the bus subscribers are known to the programmable control unit.

At this point it is noted that the programmable control unit is able to either provide separate signaling information for each display element to be actuated, or to transmit the appropriate control data for actuating multiple display elements in a single item of signaling information.

The modular bus subscriber contains multiple communication terminals, each having at least one group of connecting elements. The communication terminals may be so-called inline terminals, such as the IL TEMP 4/8 RTD SF model, for example.

In this case the signaling information may also contain an indication of the address and/or the installation site of the modular bus subscriber, or the address and/or the installation site of the particular communication terminal within the bus subscriber.

The programmable control unit advantageously provides signaling information in response to a predetermined event. A predetermined event may be an error message which, for example, is transmitted from the at least one bus subscriber to the control unit, or an input to the control unit concerning the address of one or more display elements to be actuated.

The evaluation and control unit of the bus subscriber advantageously ensures that an activated display element blinks at a predetermined blinking frequency. The blinking frequency may be selected as a function of the predetermined event. For example, when an error occurs the appropriate display element may blink at an increased blinking frequency to indicate a critical state.

The bus subscriber or the groups of connecting elements associated therewith are generally represented in each case by an address or variable. During the configuration phase an operator associates with each bus subscriber or each group of connecting elements the intended peripheral signals, for example parameters, information (I/O signals, for example), or control and/or command signals, using the particular address or variables. The assignment table thus created is stored in the control unit itself, or is provided by a separate unit and transmitted to the control unit as needed. Such assignment tables may contain errors, which may also be referred to as wiring errors. A search is made for possible wiring errors during a wiring check.

To prevent endangerment of personnel, in particular during a wiring check, the evaluation and control unit is designed in such a way that it blocks the group of connecting elements associated with the at least one selected display element in response to the signaling information. "Blocking" is understood to mean a state in which no data, regardless of the type, may be transferred from or to the actuator or sensor connected to the group of connecting elements. In other words, the signaling information causes the evaluation and control unit to shift either the entire bus subscriber, and thus all groups of connecting elements, or only certain, i.e., predetermined, groups of connecting elements of the bus subscriber into a so-called test mode. During the test mode the connection of the data channel to the particular group of connecting elements is interrupted. In this case, only the display element associated with the particular group of connecting elements is actuated. This ensures that the wiring, i.e., association of signals with a certain group of connecting elements, does not have to be checked by directly actuating the load (actuator or sensor) connected thereto. In one such case this could result in endangerment of personnel when, for example, a misaddressed actuator, an industrial robot, for example, is activated by use of an erroneous assignment table. The test mode may be terminated, for example, by an additional control signal from the control unit. For this purpose the evaluation and control unit may be designed in such a way that it deactivates the display element and reestablishes the connection to the particular group of connecting elements.

Thus, one advantage of the automated system is that a targeted search may be made for connecting terminals without having to actuate a load (actuator, sensor) connected thereto.

Accordingly, a control device is provided which has a programmable control unit and an internal communication bus. Multiple groups of connecting elements for connecting external components are connected to the communication bus. A display element is associated with each group of connecting elements. The control device also has an evaluation and control unit which actuates at least one display element in response to a control signal sent from the programmable control unit, and blocks the group of connecting elements associated with this display element.

In this manner the control device allows a targeted search to be made for one or more groups of connecting elements, also simultaneously, without having to actuate a load (actuator, sensor) connected to the connecting elements.

According to one alternative implementation, the programmable control unit and the evaluation and control unit may form a functional unit.

BRIEF DESCRIPTION OF THE DRAWINGS

The invention is explained in greater detail below with reference to two exemplary embodiments in conjunction with the accompanying drawings, which show the following.

DETAILED DESCRIPTION

Figure 1:
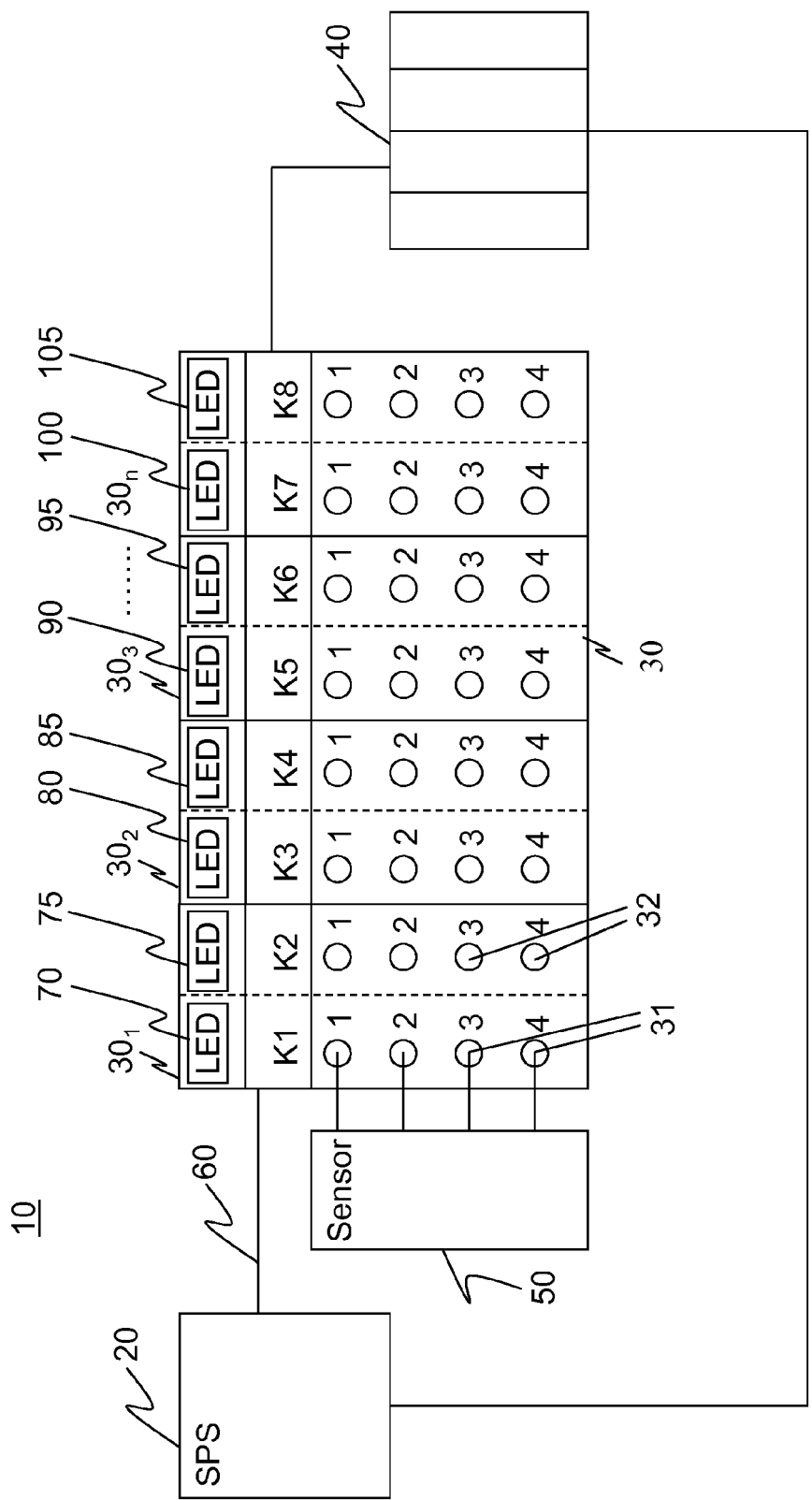
FIG. 1 shows an automated system in which the invention is implemented.

FIG. 1 shows by way of example an automated system 10 which has a ring-shaped field bus 60 via which a programmable logic controller (PLC) 20 may communicate with two bus subscribers 30 and 40, for example. Each subscriber has a modular design and has multiple connecting terminals. Due to the simplified illustration, only bus subscriber 30 is illustrated in detail. Bus subscriber 30 has a modular design and has n connecting terminals $30_1$-$30_n$ situated in parallel. In the present example, the two bus subscribers 30 and 40 each have four connecting terminals. Each connecting terminal in turn has two groups of terminal contacts. Connecting terminal $30_1$ contains a first group K1 of terminal contacts 31 and a second group K2 of terminal contacts 32. The group of terminal contacts is also referred to as a "channel" in technical jargon. A light-emitting diode 70 is associated with group K1 of terminal contacts, referred to below as "channel K1" for short, while a light-emitting diode 75 is associated with channel K2. The other connecting terminals $30_2$, $30_3$, and $30_n$ have a similar design. Thus, connecting terminal $30_2$ has two channels K3 and K4, each containing a group of four terminal contacts. Once again a light-emitting diode 80 is associated with channel K3, while a light-emitting diode 85 is associated with channel K4. Connecting terminal $30_3$ has two channels K5 and K6, each representing a group of four terminal contacts. A light-emitting diode 90 is associated with channel K5, while a light-emitting diode 95 is associated with channel K6. Connecting terminal $30_n$ likewise has two channels K7 and K8, each once again representing a group of four terminal contacts. A light-emitting diode 100 is associated with channel K7, while a light-emitting diode 105 is associated with channel K8. Solely due to the simplified illustration, a sensor 50 is connected only to channel K1 of connecting terminal $30_1$. The terminal contacts of unused channels 2 through 8 are usually bridged so as not to cause interfering signals. Power to the components connected to the communication network 60 may be supplied via the communication network 60, a separate power supply bus, or a respective localized power supply unit.

In addition, bus subscribers 30 and 40 each have an evaluation and control unit, not illustrated. The evaluation and control unit is able to receive signaling information from the programmable control unit 20 which provides an indication of which light-emitting diodes should be activated or deactivated.

The principle of operation of the automated system 10 illustrated in the figure is explained in greater detail below.

In a first scenario it is assumed that the sensor 50 connected to channel 1 of bus subscriber 30 is to be replaced. For rapid and error-free replacement by maintenance personnel, in response to the event that the sensor 50 should be replaced the programmable control unit 20 generates signaling information which identifies channel 1 of bus subscriber 30. This event may also relate to inputting the address of channel 1 to control unit 20. The generated signaling information may contain the address of bus subscriber 30 as well as the number or the address of channel K1. Depending on the implementation of the automated system, the signaling information together with process data from the programmable control unit 20 may be transmitted to bus subscriber 30 via field bus 60. Alternatively, the signaling information may also be transmitted during a separate signaling cycle. The transmitted signaling information then arrives at the evaluation and control unit of bus subscriber 30. In response to the signaling information, the evaluation and control unit detects that the light-emitting diode 70 associated with channel K1 is to be actuated. According to one advantageous embodiment, the light-emitting diode 70 blinks at a predetermined blinking frequency.

Bus subscriber 30 may be designed in such a way that replacement of the sensor 50 at the terminal contacts 31 may be detected. As soon as the removal of the sensor 50 and/or the connection of a new sensor at the terminal contacts 31 has been detected, the evaluation and control unit causes the light-emitting diode 70 to again be deactivated. Alternatively, the programmable control unit 20 may transmit additional signaling information containing deactivation instructions to bus subscriber 30. The evaluation and control unit causes LED 70 to be switched off in response to this signaling information.

In a second scenario, bus subscriber 30 of the programmable control unit 20 is able to signal errors regarding channels K3 and K4, for example. This causes the programmable control unit 20 to generate signaling information containing the addresses or numbers of channels K3 and K4 as well as an identification of bus subscriber 30. The signaling information in turn is detected in the evaluation and control unit of the bus subscriber. In response to the received signaling information the evaluation and control unit causes the light-emitting diodes 80 and 85, respectively associated with channel K3 and channel K4, to be activated.

Due to the signaling mechanism, maintenance personnel may be informed on-site in a targeted manner concerning the particular terminal contacts requiring action. It is not necessary for the maintenance personnel to have a computer on site which maps the entire automated system. Thus, at the programmable control unit 20 which is set up remotely from bus subscribers 30 and 40 an operator may generate signaling information in a targeted manner which indicates to the maintenance personnel the particular location for action at the remote bus subscribers.

The deactivation of a light-emitting diode may also be controlled by additional signaling information generated by the programmable control unit 20. For example, when the automated system 10 has successfully been started up, the programmable control unit 20 may relay corresponding signaling information via field bus 60 to bus subscribers 30 and 40. The evaluation and control unit deactivates all light-emitting diodes in response to the received signaling information.

An assignment table created by the user may be stored in a memory (not illustrated) of PLC 20. Such a table contains information, for example, concerning the particular type of component that is connected or may be connected to a particular group of connecting elements, and the particular peripheral signals that are provided for a particular group of connecting elements, and thus for the particular components. In addition, a variable, i.e., address, may be associated with each group of connecting elements and/or the component connected thereto.

To carry out a wiring check, i.e., a check of the assignment table, the user selects the "wiring check" operating mode and inputs at least one variable that is to be checked. In response to the selected "wiring check" operating mode and the inputted variables, the PLC 20 generates one or more control signals. The control signals may be transmitted cyclically, with or without process data, or acyclically via the communication network 60 to the evaluation and control unit of the bus subscriber 30 and/or 40. The evaluation and control unit evaluates the incoming control signals and causes the corresponding light-emitting diode or light-emitting diodes to be activated. At the same time, the evaluation and control unit ensures that no further signals may be transmitted via the group of connecting elements which is associated with the activated light-emitting diode. For example, if only channel 1 is addressed by the control signal, only light-emitting diode 70 is actuated, and the connection between the sensor 50 and the data channel of the communication network 60 is interrupted.

Figure 2:
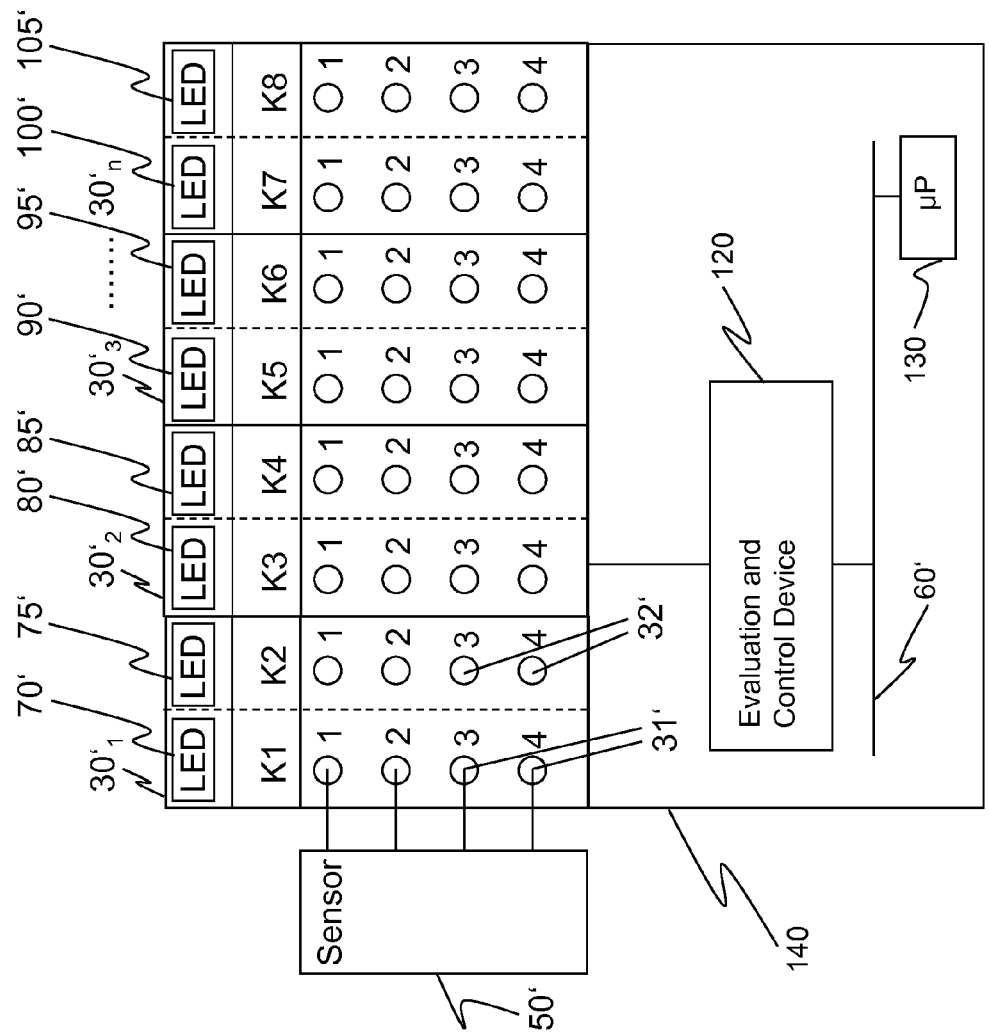
FIG. 2 shows a programmable logic controller having means for carrying out a wiring check without actuating the connecting elements.

FIG. 2 shows a programmable logic controller 140, referred to as "PLC" for short, as control device. The PLC 140 has an internal bus 60', known as such, to which a microprocessor 130, an evaluation and control unit 120, and at least one connecting terminal are connected. In the present example four connecting terminals $30'_1$ through $30'_n$ are provided. Each connecting terminal in turn has two groups of terminal contacts. Connecting terminal $30'_1$ contains a first group K1 of terminal contacts 31' and a second group K2 of terminal contacts 32'. The group of terminal contacts is also referred to as a "channel" in technical jargon. A light-emitting diode 70' is associated with group K1 of terminal contacts, referred to below as "channel K1" for short, while a light-emitting diode 75' is associated with channel K2. The other connecting terminals $30'_2$, $30'_3$, and $30'_n$ have a similar design. Thus, connecting terminal $30'_2$ has two channels K3 and K4, each containing a group of four terminal contacts. Once again a light-emitting diode 80' is associated with channel K3, while a light-emitting diode 85' is associated with channel K4. Connecting terminal $30'_3$ has two channels K5 and K6, each representing a group of four terminal contacts. A light-emitting diode 90' is associated with channel K5, while a light-emitting diode 95' is associated with channel K6. Connecting terminal $30'_n$ likewise has two channels K7 and K8, each once again representing a group of four terminal contacts. A light-emitting diode 100' is associated with channel K7, while a light-emitting diode 105' is associated with channel K8. Solely due to the simplified illustration, an external sensor 50' is connected only to channel K1 of connecting terminal $30'_1$. The terminal contacts of unused channels 2 through 8 are usually bridged so as not to cause interfering signals.

The evaluation and control unit 120 may receive a control signal from the microprocessor 130 which contains an indication of which of the light-emitting diodes should be activated and which group(s) of connecting elements should be blocked, so that no further data, regardless of the type, may be transmitted via the blocked connecting elements.

An assignment table created by the user may be stored in a memory (not illustrated). Such a table contains information, for example, concerning the particular type of component that is connected or may be connected to a particular group of connecting elements, and the particular signals that are provided for a particular group of connecting elements. In addition, a variable, i.e., address, may be associated with each group of connecting elements and/or the component connected thereto.

To carry out a wiring check, i.e., a check of the assignment table, the user selects the "wiring check" operating mode and inputs the variable or variables to be checked. In response to the selected "wiring check" operating mode and the inputted variables, the microprocessor 130 generates one or more control signals. The control signals may be transmitted cyclically or acyclically via the internal bus 60' to the evaluation and control unit 120. Depending on the implementation, the data transmitted via the bus 60' are sent only via the evaluation and control unit 120 to connecting terminals $30'_1$ through $30'_n$, or also indirectly to the connecting terminals. The evaluation and control unit 120 evaluates the incoming control signals and causes the corresponding light-emitting diode or light-emitting diodes to be activated. At the same time, the evaluation and control unit 120 ensures that no further signals may be transmitted via the group of connecting elements which is associated with the activated light-emitting diode. For example, if only channel 1 is addressed by the control signal, only light-emitting diode 70' is actuated, and the connection between the sensor 50' and the bus 60' is interrupted.

By use of the invention it is thus possible to carry out a channel-dependent wiring check without actuating the connected components.

The invention claimed is:

1. An automated system comprising:
   a communication network;
   a programmable control unit for providing signaling information; and
   a modular bus subscriber that is connectable to one or more additional modular bus subscribers via the communication network, the modular bus subscriber having the following features:
   multiple groups of connecting elements, a display element being associated with each group of connecting elements, and a sensor or actuator being connectable to each group of connecting elements, and an evaluation and control unit for actuating at least one selected display element in response to the signaling information provided by the programmable control unit, wherein for performing a wiring check and/or for identifying components that are malfunctioning or in need of replacement, in a test mode, the evaluation and control unit blocks the group of connecting elements associated with the at least one selected display element from transferring any data to and from the sensor or actuator connected to the group of connecting elements during the test mode in response to the signaling information.

2. The automated system according to claim 1, wherein the signaling information contains an indication of the address of at least one group of connecting elements and/or the site of connection of the particular group of connecting elements within the communication network.

3. The automated system according to claim 1, wherein the modular bus subscriber includes multiple communication terminals, each containing at least one group of connecting elements.

4. The automated system according to claim 3, wherein the signaling information contains an indication of the address and/or the installation site of the modular bus subscriber, and/or the address and/or the installation site of the particular communication terminal within the communication network.

5. The automated system according to claim 1, wherein the programmable control unit provides the signaling information in response to a predetermined event.

6. A control device comprising:
a programmable control unit for sending a control signal;
an internal communication bus;
multiple groups of connecting elements connected to the internal communication bus and for connecting to external components;
a display element being associated with each separate group of connecting elements; and
an evaluation and control unit which i) actuates, in a test mode, at least one display element in response to the control signal sent from the programmable control unit and ii) blocks the group of connecting elements associated with the at least one display element from transferring any data to and from the external components connected to the group of connecting elements during the test mode for performing a wiring check and/or for identifying components that are malfunctioning or in need of replacement in response to the control signal.

* * * * *